US010310575B2

(12) United States Patent
Khatri et al.

(10) Patent No.: US 10,310,575 B2
(45) Date of Patent: Jun. 4, 2019

(54) VIRTUAL AC CYCLING WITHIN AN INFORMATION HANDLING SYSTEM (71) Applicant: DELL PRODUCTS, L.P., Round Rock, TX (US)

(72) Inventors: Mukund Khatri, Austin, TX (US); Sanjiv Sinha, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 165 days.

(21) Appl. No.: 15/244,180

(22) Filed: Aug. 23, 2016

(65) Prior Publication Data
US 2018/0059752 A1    Mar. 1, 2018

(51) Int. Cl.
G06F 1/26    (2006.01)
G06F 1/24    (2006.01)
G06F 1/28    (2006.01)

(52) U.S. Cl.
CPC .............. G06F 1/263 (2013.01); G06F 1/24 (2013.01); G06F 1/28 (2013.01)

(58) Field of Classification Search
None
See application file for complete search history.

(56) References Cited

U.S. PATENT DOCUMENTS

| 7,774,633 | B1 * | 8/2010 | Harrenstien | G06F 1/24 713/300 |
| 8,429,432 | B2 * | 4/2013 | Matula | G06F 1/266 713/300 |
| 9,430,007 | B2 * | 8/2016 | Jacobson | G06F 1/28 |
| 2006/0230299 | A1 * | 10/2006 | Zaretsky | G06F 1/189 713/320 |
| 2009/0013210 | A1 | 1/2009 | McIntosh et al. | |
| 2009/0265571 | A1 * | 10/2009 | Furukawa | G06F 1/24 713/340 |
| 2011/0066869 | A1 * | 3/2011 | Wakrat | G06F 1/3225 713/324 |
| 2011/0087910 | A1 * | 4/2011 | Lambert | G06F 1/263 713/323 |
| 2011/0271131 | A1 * | 11/2011 | Lefebvre | G06F 1/26 713/323 |
| 2013/0198504 | A1 * | 8/2013 | Arnold | G06F 9/44 713/2 |

(Continued)

Primary Examiner — Kim Huynh
Assistant Examiner — Danny Chan
(74) Attorney, Agent, or Firm — Isidore PLLC (57) ABSTRACT A method and an information handling system (IHS) provides a virtual alternating current (vAC) reset of the IHS. A vAC reset module (vACRM), in response to receiving a request for the vAC reset, sets a bit within an auxiliary (AUX) based register to invoke the vAC reset when a system restart command is issued. The vACRM changes/configures a vAC recovery policy to enable main rail power to be turned on and a system start-up procedure to be initiated when a restored vAC is detected. The vACRM uses a system restart command to shutdown the main rail power and to remove power from system components powered by the main rail. The vACRM switches off AUX power to AUX powered components, based on the previously set bit, and reapplies the AUX power, following a preset interval. The vACRM turns on main rail power and initiates a system start-up procedure, according to the vAC recovery policy.

14 Claims, 5 Drawing Sheets (56) References Cited

U.S. PATENT DOCUMENTS

| | | | |
|---|---|---|---|
| 2014/0351661 A1* | 11/2014 | Benayoun | G06F 11/0766 714/57 |
| 2015/0205745 A1* | 7/2015 | Bailey | G06F 13/385 710/315 |
| 2017/0220419 A1* | 8/2017 | Kuo | G06F 11/1417 |

* cited by examiner

VIRTUAL AC CYCLING WITHIN AN INFORMATION HANDLING SYSTEM

BACKGROUND

1. Technical Field

The present disclosure generally relates to information handling systems (IHS) and in particular to auxiliary power cycling within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems increase in complexity, rich feature sets provide greater manageability, serviceability, and expandability. In numerous cases, this increased complexity has also resulted in increasing amount of critical logic being run on flea power/Aux power domain. This complexity opens more extreme remote corner cases for server system failures.

Traditionally, data center managers/administrators have been utilizing an external alternating current (AC) cycle method as a last resort to recover failed server systems. Although the AC cycle method is primarily employed as a last resort, an AC cycle has become a critical tool in troubleshooting. The AC cycle method requires an onsite technician to remove and reconnect an AC power cord or a smart-switched power distribution unit (PDU) connected to a network to AC cycle the server system remotely. However, smart-switched PDUs are expensive. As a result, a large percentage of a server install base does not deploy switched PDUs. Instead of using the switched PDU, other traditional approaches involve providing a manual AC cycle in which a local technician is deployed to physically remove and subsequently replace an AC power cord. For the manual AC cycle, the local technician presents additional overhead to operating a datacenter.

BRIEF SUMMARY

Disclosed are a method and an information handling system (IHS) that provides a virtual alternating current (vAC) reset of the IHS. A vAC reset module (vACRM), in response to receiving a request for the vAC reset, sets a bit within an auxiliary (AUX) based register to invoke the vAC reset when a system restart command is issued. The vACRM changes/configures a vAC recovery policy to enable main rail power to be turned on and a system start-up procedure to be initiated when a restored vAC is detected. The vACRM uses a system restart command to shutdown the main rail power and to remove power from system components powered by the main rail. The vACRM switches off AUX power to AUX powered components, based on the previously set bit, and reapplies the AUX power, following a preset interval. The vACRM turns on main rail power and initiates a system start-up procedure, according to the vAC recovery policy.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system (IHS) that provides a virtual alternating current (vAC) reset of the IHS. A vAC reset module (vACRM), in response to receiving a request for the vAC reset, sets a bit within an auxiliary (AUX) based register to invoke the vAC reset when a system restart command is issued. The vACRM changes/configures a vAC recovery policy to enable main rail power to be turned on and a system start-up procedure to be initiated when a restored vAC is detected. The vACRM uses a system restart command to shutdown the main rail power and to remove power from system components powered by the main rail. The vACRM switches off AUX power to AUX powered components, based on the previously set bit, and reapplies the AUX power, following a preset interval. The vACRM turns on main rail power and initiates a system start-up procedure, according to the vAC recovery policy.

As described herein, the term "virtual alternating current (vAC) reset" refers to operations that includes removing and restoring power to system logic (i.e., Main and AUX components/logic) in order to provide a remote vAC cycle of all of the server components. The vAC is performed without requiring an external smart-switched power distribution unit (PDU) and without requiring manual AC cord removal and reinsertion by a data center technician.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the IHS are not intended to be exhaustive, but rather are representative to highlight some of the components that are utilized to implement certain of the described embodiments. For example, different configurations of an IHS may be provided, containing other devices/components, which may be used in addition to, or in place of, the hardware depicted, and may be differently configured. The depicted example is not meant to imply architectural or other limitations with respect to the presently described embodiments and/or the general invention.

Figure 1:
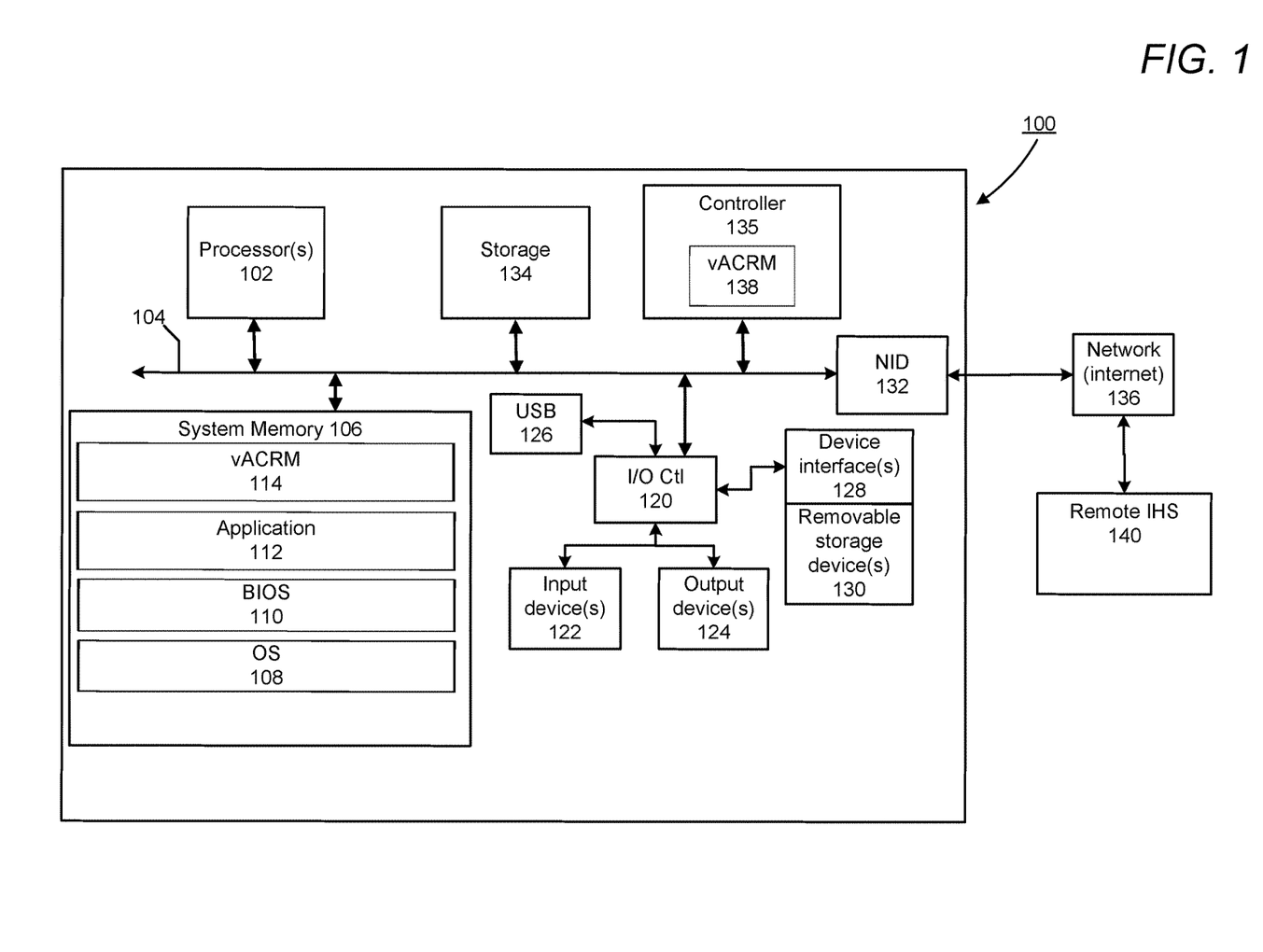
FIG. 1 illustrates an example information handling system (IHS) within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including operating system (O/S) 108, Basic Input/Output System (BIOS) (110), application(s) 112 and firmware (not separately shown). In one or more embodiments, BIOS 110 comprises additional functionality associated with unified extensible firmware interface (UEFI), and is thus illustrated as and can be more completely referred to as BIOS/UEFI 110 in these embodiments. In addition, system memory 106 includes virtual alternating current reset module (vACRM) 114. The vACRM is also more simply referred to herein as a reset management module (RMM). In one or more embodiments, the vACRM/RMM is stored and/or executed within a chassis power supply unit (e.g., PSU 304 of FIG. 3). The various software and/or firmware modules have varying functionality when their corresponding program code is executed by processor(s) 102, or by other processing devices within IHS 100. IHS 100 further includes one or more input/output (I/O) controllers 120, which support connection to, and processing of, signals from one or more connected input device(s) 122, such as a keyboard, mouse, touch screen, or microphone. I/O controllers 120 also support connection to, and forwarding of, output signals to one or more connected output device(s) 124, such as a monitor or display device or audio speaker(s).

In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as $I^2C$, SMBus, and peripheral component interconnect (PCI) buses.

IHS 100 further comprises controller 135 (e.g., a server controller, a remote access controller such as an integrated DELL Remote Access Controller (iDRAC), a Baseboard Management Controller (BMC), etc) which includes vACRM 138. The vACRM has the capability to support a vAC reset of IHS 100. IHS 100 also comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136. Remote IHS 140 is an example server or device from which a vAC reset request can be issued to IHS 100.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
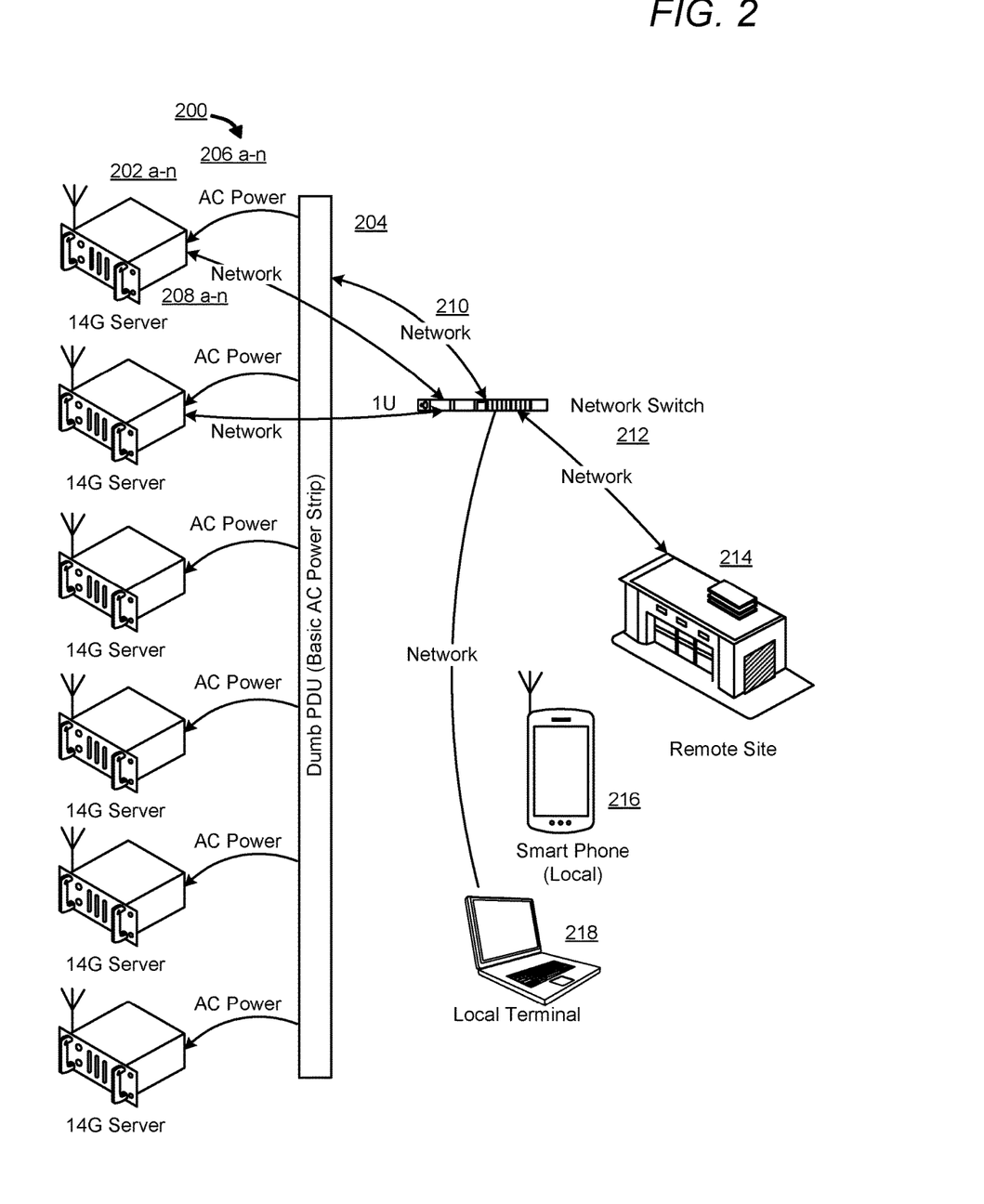
FIG. 2 depicts a block diagram illustration of a data center environment (DCE) having a number of servers for which alternating current (AC) cycling can be performed, according to one or more embodiments.

FIG. 2 depicts a block diagram illustration of a data center environment (DCE) having a number of servers for which AC cycling can be performed, according to one or more embodiments. DCE 200 includes multiple servers, illustrated as servers 202a-n, having respective antennas. DCE 200 also includes remote site 214 and local terminal 218, each having an ability to communicate with servers 202a-n over a network via network switch 212. Also illustrated in DCE 200 is smart phone 216, which has an antenna, enabling smart phone 216 to communicate with servers 202a-n. Additionally, DCE 200 includes power distribution unit (PDU) 204, which is implemented as an alternating current (AC) power strip that provides AC power via respective AC connection paths 206a-n to servers 202a-n. DCE 200 also includes network links 208a-n that connect servers 202a-n to network switch 212. PDU 204 is coupled to network switch 212 by network communication path 210.

According to one aspect, a user requests a virtual AC cycle of at least one server (e.g., server 202a) via one of remote site 214, local terminal 218 and smart phone 216. As one example application, the user can issue the request for the vAC cycle upon detecting that the server is in an unresponsive operating state. The vACRM 114, operating within servers 202a-n, receives the vAC cycle request and in response to receiving the request, sets a bit within a complex programmable logic device (CPLD) or other Auxiliary (AUX) based register to invoke a vAC reset when a "Next System RESTART" command is issued. The vACRM 114 then changes a configurable vAC Recovery Policy to "Always Power ON on vAC Restore" (i.e., turn on main rail power and initiate a server start-up procedure when a restored vAC is detected). After changing the vAC Recovery Policy, vACRM 114 uses a restart command to initiate a shutdown of server 202a, which shutdown includes a shutdown of the main rail power, resulting in a removal of power from components of server 202a powered by the main rail. Using auxiliary power switch 310 (FIG. 3), vACRM 114 removes AUX power from AUX powered components (i.e., switches off power to AUX powered components), based on the previously set bit. The vACRM 114 reapplies (i.e., switches on) AUX power to AUX powered components, following a preset interval. The vACRM 114 triggers a "DC power-on" (i.e., a turning on of main rail power and initiation of the server start-up procedure), in response to detecting a reapplied AUX power, according to the vAC recovery policy.

A remote virtual AC cycle is issued to servers 202a-n via a network link (e.g., network link 208a) that bypasses communication with a PDU (e.g., PDU 204). In other words, the remote vAC is performed without the need for external, smart-switched PDUs and/or without requiring a human in the datacenter to remove and reapply AC power manually. The remote vAC enables the server to power cycle the hardware, Main & AUX power rails, emulating an AC power cycle, while incurring relatively low costs.

Figure 3:
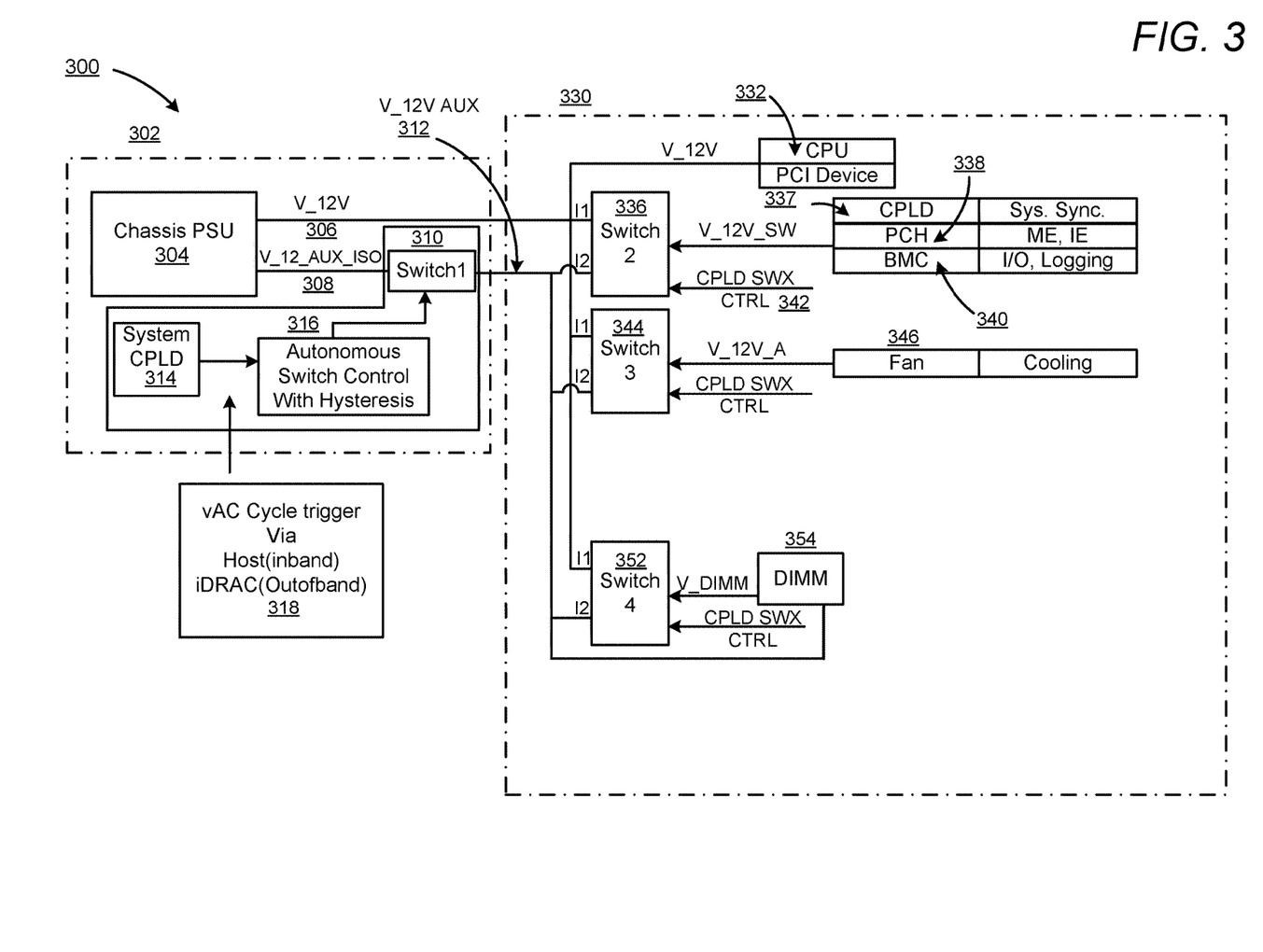
FIG. 3 is a block diagram illustration of an example server platform having an auxiliary power switch, according to one or more embodiments.

FIG. 3 is a block diagram illustration of an example server platform having an auxiliary power switch, according to one or more embodiments. IHS 300 includes power control sub-system (PCS) 302 and platform electronic components (PECs) 330. PCS 302 includes chassis power supply unit (PSU) 304 which provides main power illustrated as "V_12V" 306 for a main power rail and auxiliary power illustrated as "V_12V_AUX_ISO" 308. In addition, PCS 302 includes first switch 310 (i.e., the auxiliary power switch) which is coupled to PSU 304 at a PSU output port that provides "V_12V_AUX_ISO" 308. When configured in an ON state, first switch 310 yields "V_12VAUX" 312 at an output port of switch 310. "V_12VAUX" 312 represents an auxiliary power rail of IHS 300. PCS 302 also includes system complex programmable logic device (CPLD) 314 and autonomous switch control 316 which is coupled to an output port of system CPLD 314. Additionally, autonomous switch control 316 is coupled to switch 310. Also illustrated within PCS 302 is "vAC" cycle trigger 318. In one embodiment, vAC cycle trigger 318 is provided by a host application (e.g., application 112 of FIG. 1) based on a request that is received via an in-band management tool. However, in another embodiment, vAC cycle trigger 318 is provided by a server controller (e.g., controller 135 of FIG. 1) based on a request that is received via an out-of-band management tool.

PECs 330 includes various types of components, including CPU 332. In addition, PECs 330 include second switch 336, third switch 344, fourth switch 352 and fifth switch 356, which are respectively coupled to various electrical components and/or sub-systems. For example, second switch 336 is coupled to a number of components including CPLD 337, PCH 338 and BMC 340. First CPLD switch control signal 342 is received by second switch 336 and is used to toggle between Main and Auxiliary power. For example, second switch 336 utilizes Auxiliary power only when Main power is not available. Third switch 344 is coupled to fan 346. Fourth switch 352 is coupled to Dual In-line Memory Module (DIMM) 354. Fifth switch not shown) is coupled to battery (not shown), which provides power to DIMM 354.

As illustrated, IHS 300 includes one or more switches (e.g., first switch 310). First switch 310 (i.e., auxiliary power switch) automatically connects chassis power supply auxiliary power (e.g., "V_12V_AUX_ISO" 308) to server auxiliary power when AC power is available (e.g., "V_12VAUX" 312).

According to one or more aspects, virtual AC (vAC) trigger/request 318 to the server (e.g., IHS 300) can be issued via an in-band connection to one of a host CPU/processor and a host OS. Alternatively, a vAC request can be issued via an out-of-band connection through a use of user applications or via wireless fidelity (WiFi) technologies. A user can issue a vAC cycle request from a host/OS interface via standard in-band tools. In one embodiment, these in-band tools can include a new vAC reset option in a utility menu. Alternatively, these in-band tools can include a custom management application with an option to trigger a vAC request.

When a server controller (135) (e.g., a BMC) is fully functional, or functional enough to deliver a vAC request via an out-of-band connection, an administrator/user/proprietary tool can issue a vAC request targeting the system via standard OOB tools (e.g., RACADM, Web services for Management (WSMAN), Redfish, etc). Issuing a vAC cycle to a server (e.g., IHS 300) involves two steps: (a) shutting down the server and removing AUX power to turn off power to all of the system logic (i.e., Main and AUX components/logic); and (b) ensuring that the server (e.g., IHS 300) can successfully power-up when AUX power is re-applied as part of re-powering up the server.

According to one or more aspects, turning off all the power to system logic (i.e., Main and AUX components/logic) involves the following enumerated steps: (1) A newly defined bit "vAC power cycle request bit" in CPLD 314 (or in another AUX based register(s)) is set, where the bit holds/registers a user request to toggle chassis AUX power on "next" system restart. According to one embodiment, application 112 is capable of directly setting the vAC power cycle request bit (i.e., without invoking the BIOS), in response to receiving a power cycle request; (2) The "After_G3" (i.e., system OFF State where no power is consumed) policy setting in the platform controller hub (PCH)/Southbridge (e.g., the "vAC Restart/Recovery policy" in the chipset), which is set to "Always Power up on new vAC application", is changed. In one implementation, the vAC restart policy setting is located in a real time clock (RTC) well of a corresponding chipset, and, as a result, is preserved across vAC restart or vAC removal/loss operations (i.e., vAC reset operations); (3) The previously described steps involved in turning off all the power to system logic can be optionally combined in one request via application to the platform using a Basic Input/Output System (BIOS) System Management Interrupt (SMI) as the mechanism/abstraction layer. In particular, the host application 112 or server controller 135 can invoke the BIOS via SMI to (i) write to the CPLD (314) to set the "vAC power cycle request bit" and (ii) change the vAC restart policy in the chipset. In another implementation, the application can invoke the BIOS using a different mechanism, interface, or application programmable interface (API); (4) A "system restart" using one of a graceful shutdown and an ungraceful shutdown is issued. The "system restart" involves executing a "Direct current (DC) power cycle" of the system. The "DC power cycle" refers to a turning off and subsequent returning of main system power accompanied by a respective shutdown and a respective start-up of the IHS. A graceful shutdown involves a command to "power off the system" which is proceeded by a request to the host OS 108 to perform an established OS shutdown process. As a result, the graceful shutdown enables all work-in-progress to be saved and ensures data integrity. Unlike the graceful shutdown, an ungraceful shutdown involves the command to "power off the system" but does not involve the established OS shutdown process; (5) Any of the above four steps associated with turning off all the power to system logic can either be issued via an in-band path (e.g., OS 108/host applications 112) or via an out-of-band path (e.g., server controller 135/BMC); (6) The system main rail power shuts off first (i.e., power off "S5" state) as part of system shutdown portion of a system power cycle; (7) The CPLD (e.g., CPLD 314), which runs off of the AUX power rail, then issues a toggle-trigger to "AUX Power Control Switch" in response to the system being in the power off "S5" state. The CPLD may optionally reset the "vAC power cycle request bit" in the CPLD before issuing the vAC toggle-trigger to the AUX power control switch. Alternatively, the BIOS can be configured to perform this task (i.e., of resetting the "vAC power cycle request bit" in the CPLD before issuing the vAC toggle-trigger) on each system power up; and (8) The AUX power control switch is an analog switch designed to toggle the AUX power to the output side. For example, AUX power control switch 310 removes the AUX power from the switch's output side and then re-applies AUX power after a pre-determined short duration. At this step of powering off of the server when AUX power is removed from the switch's output side, all of the system components, except the power supplies (e.g., PSU 304), are in a powered off state.

Turning the server back ON (i.e., to complete the vAC cycle) and restoring power to system logic (i.e., Main and AUX components/logic) involves the following number of enumerated steps. (1) AUX power control switch 310 is designed to re-apply AUX power to the switch's output after a fixed/predetermined duration, thereby initiating AUX power application to CPLD 314, PCH 338 and all of the system components on the AUX power rail. (2) PCH 338/Chipset, which was previously set to "Always Power up on vAC application", on detecting vAC power restoration, will issue a system power ON sequence to power on the rest of the server system. (3) The system will power-up following the standard designed power-sequencing of various rails and sub-systems. All AUX-powered subsystems are full restarted. (4) The BIOS re-programs/initializes the PCH to a user-configured setting for the vAC recovery option (i.e., a BIOS setup setting).

The steps involving removing and restoring power to system logic in order to provide a remote vAC cycle of all of the server components are performed without requiring an external smart-switched PDU and without requiring manual AC cord removal and reinsertion by a data center technician.

In one or more alternate embodiments, a new one-shot BIOS attribute of "vAC restart on next boot=Enabled/disabled" can be created. When the attribute is set (i.e., enabled), the BIOS handles writing of respective bits to CPLD and PCH registers to enable the same flow of steps which result in a vAC cycling of server components as described above.

In one or more related embodiments, a new option involves enhancements to Advanced Configuration and Power Interface (ACPI) sleep states which are reported to OS 108. This new option can enable an OS restart menu to invoke a vAC restart based on a reported ACPI sleep state and/or standard sleep states supported by OS 108, as per BIOS directive.

According to one or more aspects, added/modified functionality used to support the vAC process such as an addition of the new one-shot BIOS attribute and/or the enhancements to ACPI sleep states may be provided using one or more firmware (FW) updates of critical updateable/programmable components in the AUX domain/rail.

As described above, a remote vAC cycle for all of the server components can be invoked/triggered via an in-band/host CPU interface or via out-of-band/BMC interfaces. In addition, a selected reset/restart of individual components (e.g., the iDRAC, CPLD, etc) can be performed without restarting all of the server components.

According to one or more embodiments, a chipset watchdog timer (WDT) functionality and/or a BMC WDT timer functionality are expanded to invoke full system vAC restart under specific conditions and based on platform policy.

According to one or more aspects, the vAC is performed to re-initialize/clear server liquid crystal display (LCD) and similar components as part of a full recovery of a server state from critical failures such as CPU IERR (i.e., internal error).

Figure 4:
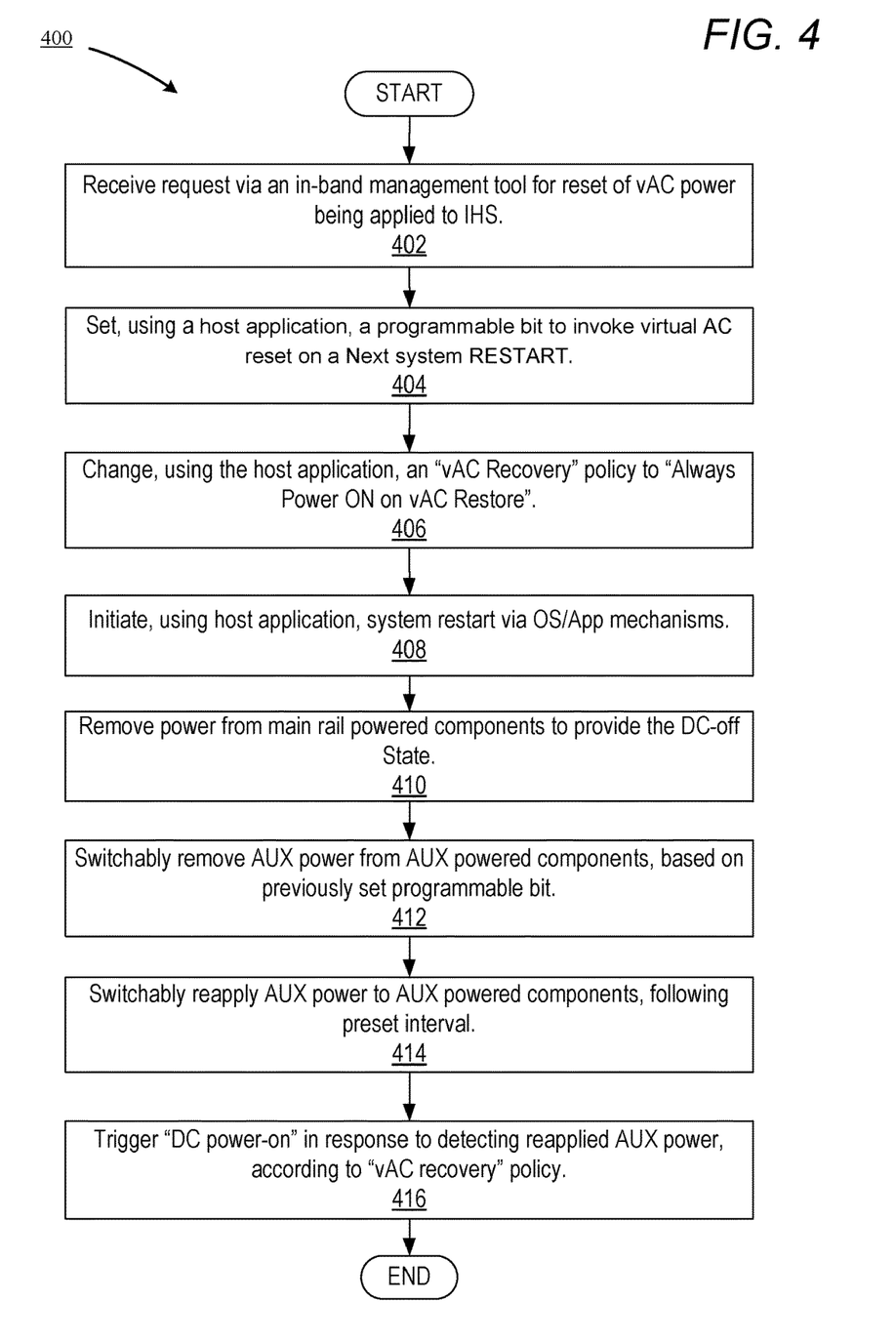
FIG. 4 is a flow chart illustrating a method for performing a virtual AC reset via an in-band management connection, according to one embodiment.
Figure 5:
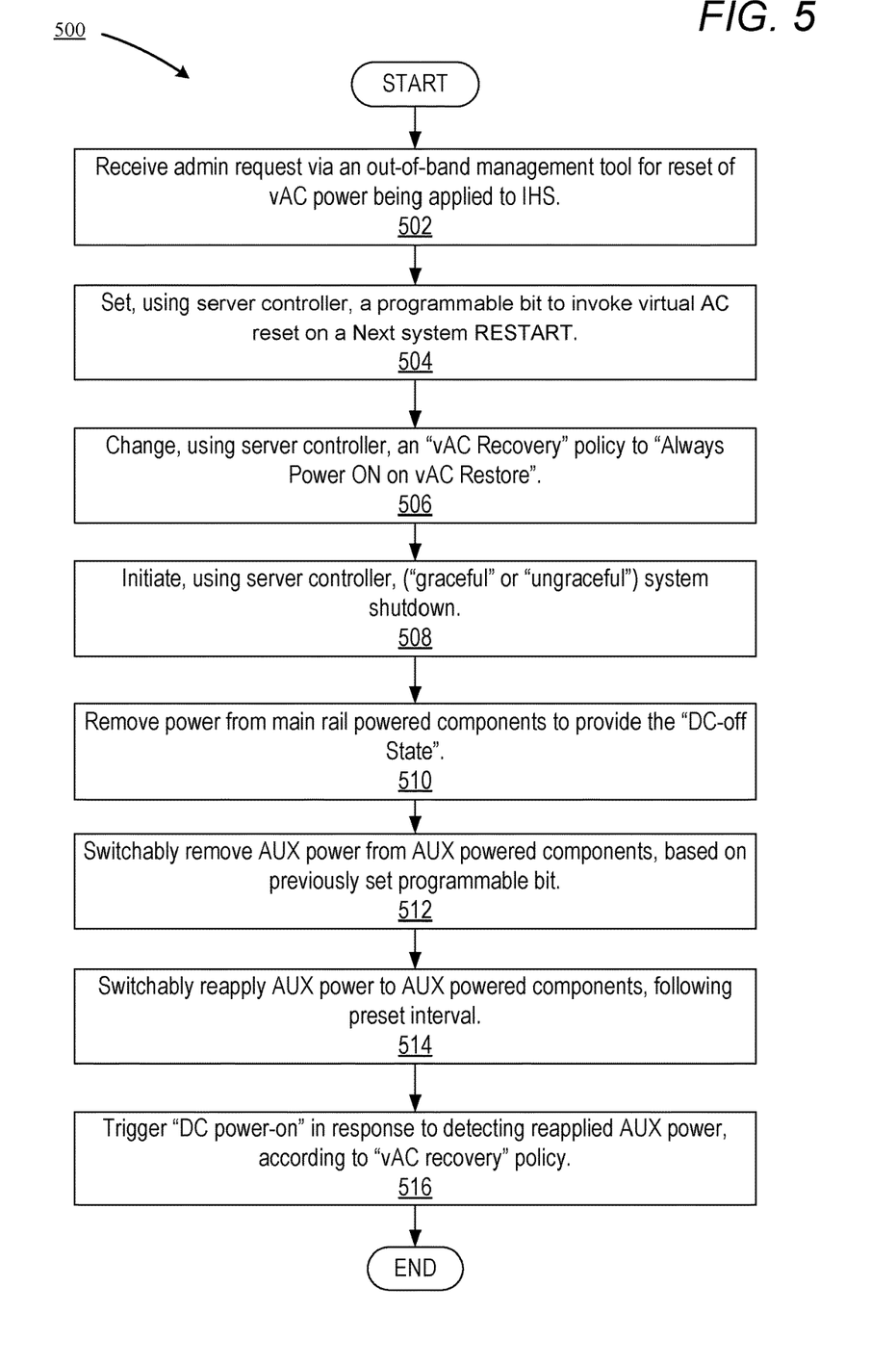
FIG. 5 is a flow chart illustrating a method for performing a virtual AC reset via an out-of-band management connection, according to one embodiment.

FIGS. 4 and 5 present flowcharts illustrating example methods by which IHS 300, and specifically vAC cycle module 114/138 presented within the preceding figures, perform different aspects of the processes that enable one or more embodiments of the disclosure. Method 400 represents a method for performing a virtual AC reset via an in-band management connection. Method 500 represents a method for performing a virtual AC reset via an out-of-band management connection. The description of each method is provided with general reference to the specific components illustrated within the preceding figures. It is appreciated that certain aspects of the described methods may be implemented via other processing devices and/or execution of other code/firmware. In the discussion of FIGS. 4 and 5, reference is also made to elements described in FIGS. 1-3.

Method 400 begins at the start block and proceeds to block 402 at which vACRM 114/138 receives a request via an in-band management tool for a reset of vAC power being applied to IHS. vACRM 114/138 sets, using a host application, a programmable bit to invoke virtual AC reset on a next system restart (block 404). Using the host application, vACRM 114/138 changes a "vAC Recovery" policy to "Always Power ON on vAC Restore" (block 406). vACRM 114/138 initiates a system restart via OS/App mechanisms (block 408). vACRM 114/138 triggers and detects power being removed from main rail powered components to provide the DC-off State (block 410). vACRM 114/138 removes AUX power from AUX powered components, based on the previously set programmable bit (block 412). Following a preset interval, vACRM 114/138 reapplies AUX power to AUX powered components (block 414). vACRM 114/138 triggers "DC power-on" in response to detecting reapplied AUX power, according to "vAC recovery" policy (block 416). The process concludes at the end block.

Method 500 begins at the start block and proceeds to block 502 at which vACRM 114/138 receives an administrator request via an out-of-band management tool for a reset of vAC power being applied to IHS. vACRM 114/138 sets, using server controller 135, a programmable bit to invoke virtual AC reset on a next system restart (block 504). Using server controller 135, vACRM 114/138 changes a "vAC Recovery" policy to "Always Power ON on vAC Restore" (block 506). vACRM 114/138 initiates a system shutdown via server controller 135 (block 508). vACRM 114/138 triggers and detects power being removed from main rail powered components to provide the DC-off State (block 510). vACRM 114/138 removes AUX power from AUX powered components, based on the previously set programmable bit (block 512). Following a preset interval, vACRM 114/138 reapplies AUX power to AUX powered components (block 514). vACRM 114/138 triggers "DC power-on" in response to detecting reapplied AUX power, according to "vAC recovery" policy (block 516). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   a main power rail;
   an auxiliary (AUX) power rail;
   an auxiliary (AUX) power control switch coupled between a chassis power supply AUX power and the AUX power rail;
   electronic components coupled to the AUX power rail;
   a reset management module (RMM);
   a processor which executes the RMM and which is communicatively coupled to the AUX power control switch, wherein the processor:
   receives, by a controller at a host/OS interface via one of an in-band management tool and an out-of-band management tool, a request for a virtual alternating current (vAC) reset of the IHS; and
   in response to receiving the request for the vAC reset:
     sets, via an application, a bit within an AUX register of an AUX based device to invoke the vAC reset if a system restart command is issued; and
     performs the virtual AC reset of the system by using the AUX power control switch to control a switching of AUX power to the AUX power rail which is coupled to an output of the AUX power control switch,
   wherein the processor:
     configures a vAC recovery policy to enable main rail power to be turned on and a system start-up procedure to be initiated when a restored vAC is detected;
     executes at least one of (i) a write to the AUX register to set said bit and (ii) a change of the vAC recovery policy setting to trigger a system re-start whenever vAC power is reapplied to said output, wherein said vAC recovery policy setting is maintained within a controller circuitry of a core logic chipset and is preserved across vAC reset operations;
     initiates said main rail power shut-down using a system restart command; and
     in response to detecting said main rail power shut-down while said bit is set, toggles the chassis AUX power to remove said power from the output of the AUX power control switch;
   wherein the controller (i) sets said bit and (ii) changes the vAC recovery policy setting by performing one of (a) invoking the BIOS and (b) directly changing the vAC recovery policy setting.

2. The IHS of claim 1, wherein to perform the switching, the processor:
   in response to receiving the request, executes a main rail power shut-down which switches off power to components powered by the main rail;
   in response to the main rail power being shut-down, switches off power from the output of the AUX power control switch and to AUX powered electrical components;
   switches on power to the output of the AUX power control switch following a pre-established time interval after switching off power from the output of the AUX power control switch; and
   in response to switching on the power to the output of the AUX power control switch, switches on main rail power and initiates a system start-up procedure.

3. The IHS of claim 2, wherein the processor:
   resets said bit within said AUX register during one of (a) a period preceding a switching off of power from the output of the AUX power control switch and (b) each system power-up period that follows a switching off of power from the output of the AUX power control switch.

4. The IHS of claim 1, wherein:
   said reset is initiated in response to and to correct a fault resulting from an observed low level of responsiveness associated with at least one of system hardware and system firmware.

5. The IHS of claim 1, wherein:
   said shutdown of the IHS comprises one of (i) a graceful shutdown of the IHS, wherein an established operating system based shutdown procedure is executed and (ii)

an ungraceful shutdown of the IHS, wherein the established operating system based shutdown procedure is not executed.

6. The IHS of claim 1, wherein:
said vAC reset is used to cycle the AUX power rail and is performed without utilizing an external PDU switching and without requiring physical removal or physical re-applying of AC power of chassis power supplies, wherein said chassis power supplies remain within an active state allowing stored bit information in the AUX based register to be used to trigger a restart of main power and a corresponding start-up of the IHS.

7. The IHS of claim 1, wherein:
the RMM is stored and executed within a chassis power supply unit that provides the main power rail and the AUX power rail.

8. In an information handling system (IHS), a processor-implemented method comprising:
receiving, at a host/OS interface via an in-band management tool, a request for a virtual alternating current (AC) reset of the IHS; and
in response to receiving the request:
setting, via an application, a bit within an AUX register of an AUX based device to invoke the vAC reset if a system restart command is issued and changing a vAC recovery policy setting; and
performing the virtual AC reset of the system by using an auxiliary (AUX) power control switch to control a switching of an AUX power to an AUX power rail which is coupled to an output of the AUX power control switch, wherein the AUX power control switch is coupled between an AUX power output of a chassis power supply and the AUX power rail, wherein the performing includes:
configuring the vAC recovery policy to enable main rail power to be turned on and a system start-up procedure to be initiated when a restored vAC is detected;
executing at least one of (i) a write to the AUX based register to set said bit and (ii) a change of the vAC recovery policy setting to trigger a system restart whenever vAC power is re-applied to said output, wherein said vAC recovery policy setting is maintained within a controller circuitry of a core logic chipset and is preserved across vAC reset operations;
initiating said main rail power shut-down using a system restart command; and
in response to detecting said main rail power shut-down while said bit is set, toggling the chassis AUX power to remove said power from the output of the AUX power control switch.

9. The method of claim 8, further comprising:
in response to receiving the request, executing a main rail power shut-down which switches off power to components powered by the main rail;
in response to the main rail power being shut-down, switching off power from the output of the AUX power control switch and to AUX powered electrical components;
switching on power to the output of the AUX power control switch following a pre-established time interval after switching off power from the output of the AUX power control switch; and
in response to switching on the power to the output of the AUX power control switch, switching on main rail power and initiating a system start-up procedure.

10. The method of claim 9, further comprising:
resetting said bit within said AUX based register during one of (a) a period preceding a switching off of power from the output of the AUX power control switch and (b) each system power-up period that follows a switching off of power from the output of the AUX power control switch.

11. In an information handling system (IHS), a processor-implemented method comprising:
receiving a request to trigger a virtual alternating current (AC) reset of the IHS at a server controller via an out-of-band management tool;
in response to receiving the request:
setting, via the server controller a bit within an AUX register of an AUX based device to invoke the vAC reset if a system restart command is issued; and
changing a vAC recovery policy setting by performing one of (a) invoking a BIOS and (b) directly changing the vAC recovery policy setting; and
performing the virtual AC reset of the system by using an auxiliary (AUX) power control switch to control a switching of AUX power to an AUX power rail which is coupled to an output of the AUX power control switch, wherein the AUX power control switch is coupled between an AUX power output of a chassis power supply and an AUX power rail, wherein the performing includes: configuring a vAC recovery policy to enable main rail power to be turned on and a system start-up procedure to be initiated when a restored vAC is detected; executing at least one of (i) a write to the AUX based register to set said bit and (ii) a change of the vAC recovery policy setting to trigger a system re-start whenever vAC power is re-applied to said output, wherein said vAC recovery policy setting is maintained within a controller circuitry of a core logic chipset and is preserved across vAC reset operations; initiating said main rail power shut-down using a system restart command; and in response to detecting said main rail power shut-down while said bit is set, toggling the chassis AUX power to remove said power from the output of the AUX power control switch.

12. The method of claim 8, wherein:
said reset is initiated in response to, and in order to correct, a fault resulting from an observed low level of responsiveness associated with at least one of system hardware and system firmware.

13. The method of claim 8, wherein:
said shutdown of the IHS comprises one of (i) a graceful shutdown of the IHS, wherein an established operating system based shutdown procedure is executed and (ii) an ungraceful shutdown of the IHS, wherein the established operating system based shutdown procedure is not executed.

14. The method of claim 8, wherein:
said vAC reset is used to cycle the AUX power rail and is performed without utilizing an external PDU switching and without requiring physical removal or physical re-applying of AC power of chassis power supplies, wherein said chassis power supplies remain within an active state allowing stored bit information in the AUX based register to be used to trigger a restart of main power and a corresponding start-up of the IHS.

* * * * *